United States Patent
Minko

(10) Patent No.: US 7,263,381 B2
(45) Date of Patent: Aug. 28, 2007

(54) SYSTEM AND METHOD FOR DISCOVERING IDENTITIES AND CAPABILITIES OF NEARBY TELEPHONES

(75) Inventor: Jacek Tomasz Minko, 3110 Florence Park Dr., San Jose, CA (US) 95135

(73) Assignee: Jacek Tomasz Minko, San Jose, CA (US)

( * ) Notice: Subject to any disclaimer, the term of this patent is extended or adjusted under 35 U.S.C. 154(b) by 0 days.

(21) Appl. No.: 10/898,544

(22) Filed: Jul. 26, 2004

(65) Prior Publication Data

US 2005/0059389 A1    Mar. 17, 2005

Related U.S. Application Data

(60) Provisional application No. 60/489,963, filed on Jul. 25, 2003.

(51) Int. Cl.
*H04M 1/00* (2006.01)

(52) U.S. Cl. .............. 455/553.1; 455/552.1; 455/550.1; 455/423; 455/425; 455/429; 455/432.1; 455/433

(58) Field of Classification Search ........... 455/553.1, 455/552.1, 550.1, 423, 425, 429, 432.1–433
See application file for complete search history.

(56) References Cited

U.S. PATENT DOCUMENTS

| | | | |
|---|---|---|---|
| 2002/0115471 A1* | 8/2002 | De Loye et al. ............ 455/552 |
| 2003/0092452 A1* | 5/2003 | Youngs et al. ............. 455/461 |
| 2004/0204033 A1* | 10/2004 | Yang .................... 455/552.1 |
| 2004/0242163 A1* | 12/2004 | Karr et al. ................. 455/73 |

* cited by examiner

*Primary Examiner*—Joseph Feild
*Assistant Examiner*—Khai Nguyen

(57) ABSTRACT

A system and method is described here for discovering capabilities of nearby telephones using a secondary communication channel. The secondary communication channel can use various media that can include infrared, Bluetooth, Wi-Fi 802.11 a/b/g, or any other medium that is not used for the purpose of primary telephone communication. Usage of the secondary channel isolates this feature from the state of the art system and at the same time provides for a common method of interoperability for various telephones. Infrared communication for the secondary channel is preferred, due to its cost, and easy of usage.

4 Claims, 7 Drawing Sheets

```
<?xml version="1.0" encoding="UTF-8"?>
<RequestedDeviceDefinition>
<Description Name="SDP">
<Value v="0"/>
<Value o="SrcDevice 2890844526 2890844526 IN IP4 my.host.com"/>
<Value s="IR Phone Discovery"/>
<Value t="0 0"/>
<Value c="IN IP4 my.host.com"/>
<Value m="audio 19140 RTP/AVP 0"/>
<Value a="rtpmap:0 PCMU/8000"/>
<Value m="video 20140 RTP/AVP 31"/>
<Value a="rtpmap:31 H261/90000"/>
</Description>
</RequestedDeviceDefinition>
```

Fig. 4

```xml
<?xml version="1.0" encoding="UTF-8"?>
<RequestedDeviceDefinition>
<DeviceID>
<Value name="sip:device@ir.host.com SIP/2.0"/>
</DeviceID>
<Description Name="SDP">
<Value v="0"/>
<Value o="DstDevice 2890844730 2890844730 IN IP4 discovered.host.com"/>
<Value s="IR Phone Discovery"/>
<Value t="0 0"/>
<Value c="IN IP4 discovered.host.com"/>
<Value m="audio 23456 RTP/AVP 0"/>
<Value a="rtpmap:0 PCMU/8000"/>
</Description>
</RequestedDeviceDefinition>
```

Fig. 5

```
<?xml version="1.0" encoding="UTF-8"?>
<RequestedDeviceDefinition>
  <DeviceID>
    <Value name="sip:192.168.10.20 SIP/2.0"/>
  </DeviceID >
  <Description Name="SDP">
    <Value v="0"/>
    <Value o="DstDevice 2890844730 2890844730 IN IP4 discovered.host.com"/>
    <Value s="IR Phone Discovery"/>
    <Value t="0 0"/>
    <Value c="IN IP4 discovered.host.com"/>
    <Value m="audio 23456 RTP/AVP 0"/>
    <Value a="rtpmap:0 PCMU/8000"/>
  </Description>
</RequestedDeviceDefinition>
```

```
<?xml version="1.0" encoding="UTF-8"?>
<RequestedDeviceDefinition>
  <DeviceID>
    <Value name="01 555 123 4567"/>
  </DeviceID >
</RequestedDeviceDefinition>
```

SYSTEM AND METHOD FOR DISCOVERING IDENTITIES AND CAPABILITIES OF NEARBY TELEPHONES

This application claims priority under 35 U.S.C. § 119 to U.S. Provisional Application Ser. No. 60/489,963 filed on Jul. 25, 2003, the entire content of which is hereby incorporated herein by reference.

CROSS-REFERENCE TO ATTACHED APPENDIX

Appendix A, containing a listing of computer software code (computer program listing appendix), is a part of the present disclosure and is incorporated by reference herein in its entirety. The compact disc contains the following files created on Jul. 26, 2004;

| Size (Bytes) | Name |
| --- | --- |
| 3,124 | ChildView.cpp |
| 7,320 | IrServer.cpp |
| 1,834 | IrServer.h |

BACKGROUND

1. Field of the Invention

This invention defines a system and method for discovering nearby telephones and their corresponding identities and capabilities using a special broadcast and response from such devices using a secondary channel for such communication.

2. Background Information

A Service Provider is defined in this document as the entity that provides call routing and distribution. It can include a company PBX, or VoIP PBX (IP-PBX), it can be a Centrex system, or it can be a traditional telephone service provider (e.g., PacBell).

An Endpoint (EP) will be defined here as a device that provides capabilities for generating and/or terminating plurality of information streams.

In this document, the word "telephone" or "phone" will be used in its most general sense and will encompass a home telephone, office telephone, conference phone, cell phone, PDA, videophone, etc. Endpoint can be used interchangeably with Phone.

An Originating Device (OD) is a device that originally owns a telephone call, and wants to interact with a different Endpoint. For the purpose of this document, an Originating Device will be considered to be a Mobile Phone.

An Endpoint ID (EP-ID) is the identity of the Telephone. For example, it could be a normal telephone number (555-123-4567), it also could be an IP address of IP phone, or fully qualified VoIP (SIP, MGCP, H.323, etc.) address.

Endpoint Capabilities (EP-CAP) consist of features that EP supports, e.g., telephone's name (e.g., John's Phone), protocol used (POTS, SIP, H.323, ISDN), media streams supported (e.g., audio only, POTS channel, video and audio), audio compressions, etc. It also includes Endpoint ID (EP-ID). Therefore, for the purpose of this document, whenever Endpoint ID is used, it can be always substituted with Endpoint Capabilities. Information included in the Endpoint Capabilities could be used to transfer a pending call to the other telephone (either IP based, or just a different hand-set). It could also be used to invite another telephone to a conference call. Such a situation can occur when an End User moves from one room to another room while holding a telephone conversation. The other room might have a telephone that is not marked (e.g., conference room phone that does not have a label on it).

In the present state of the art, if an End User wishes to determine the location of various telephones in a vicinity and the various telephone Endpoint Capabilities, End User has to inquire, about them individually, which is awkward, time consuming, and may not even be possible at the time. In essence, there is no automated way in the present state of the art for an End User to query and determine these telephone locations and properties.

SUMMARY OF THE INVENTION

In accordance with exemplary embodiments, this device and method defines a means of communication and a process and method for discovering nearby telephones and their identifying information using a special broadcast and collecting response from such devices, using a secondary channel for such communication that lies outside of all the commercially available primary channels. It also specifies a method for formatting information being exchanged using the XML (Extensible Markup Language) for ease of collection and parsing of supplied data. Finally, it specifies a method for formatting Endpoint Capabilities using Session Description Protocol (SDP).

DESCRIPTION OF DRAWINGS

FIG. 7. XML only formatted response providing telephone number of the Endpoint

DETAILED DESCRIPTION OF THE PREFERRED EMBODIMENTS

In order to discover nearby telephones and their identifying information, it is necessary to introduce a querying system, to operate it on a secondary channel which resides outside of all the commercially available primary channels, and to format information being exchanged using the XML (Extensible Markup Language) for ease of collection and parsing of supplied data, and to format Endpoint Capabilities using Session Description Protocol (SDP).

Figure 1:
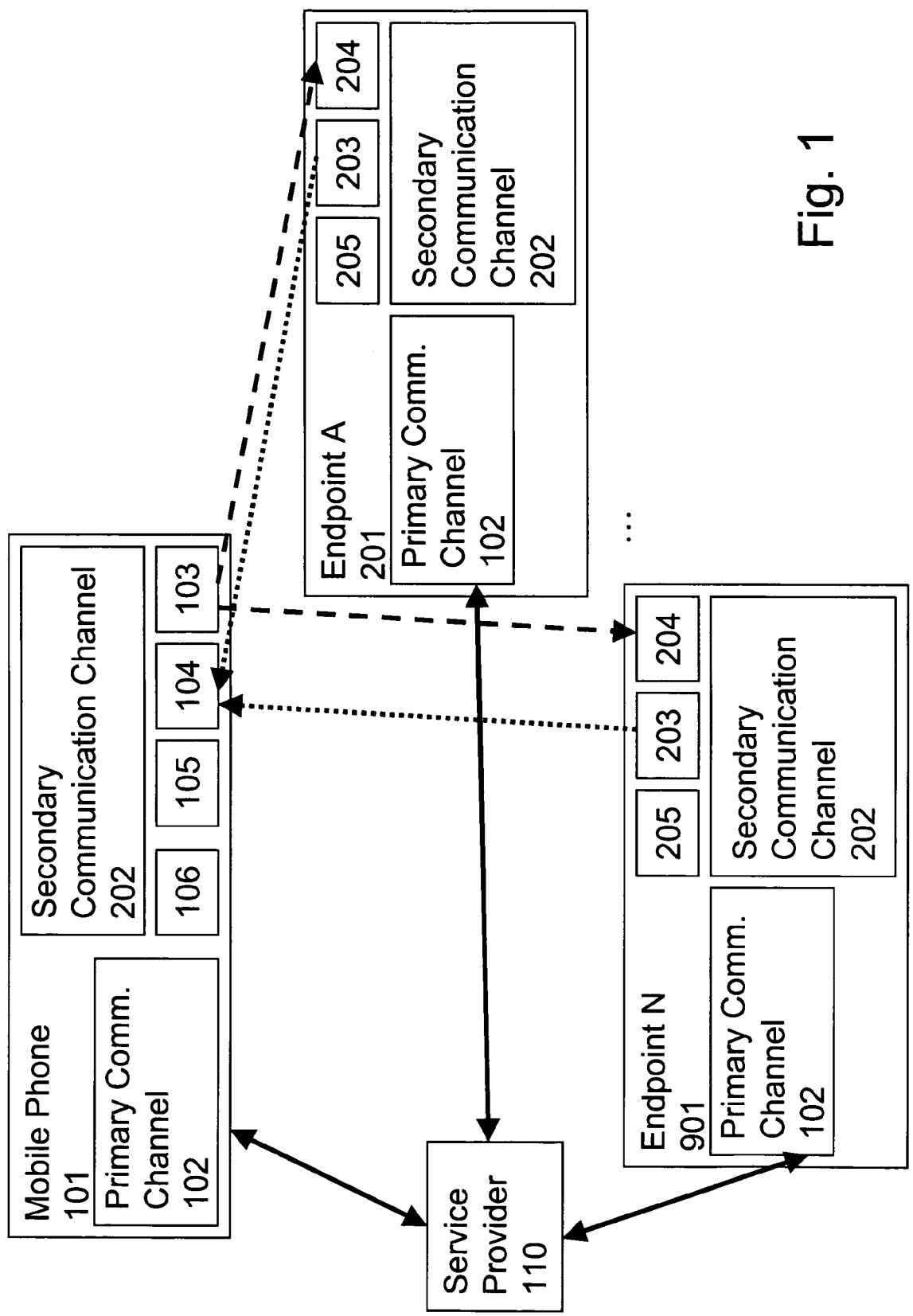
FIG. 1. Telephone discovery system and device using the secondary communication channel FIG. 2. Telephone discovery and direct call transfer with call control kept on the originating device FIG. 3. Telephone discovery and a call transfer with a complete call handoff FIG. 4. XML and SDP formatted request for other Endpoints capabilities FIG. 5. XML and SDP formatted answer specifying Endpoint SIP address and telephones capabilities FIG. 6. Alternate response providing direct IP address of a VoIP phone, and its capabilities.

Wireless communications in a querying system comprises of several modules both on querying and on target telephones, as shown in FIG. 1. A Mobile Phone 101 represents a querying entity. Mobile Phone 101 is equipped with a wireless Transmitting Device 103 that broadcast query signals. Endpoint A 201 has affixed a wireless Receiving Device 204 that detects presence of broadcasted query signals. In the event when Endpoint A 201, using its wireless Receiving Device 204, discovers such signal, a Signal Processing Device 205 detects and format its Endpoint Identity and Capability. Next, Signal Processing Device 205 passes the processed Endpoint Identity and Capability to the wireless Transmitting Device 203 that resides on Endpoint A for outgoing transmission. Wireless Transmitting Device 203 sends a reply to the broadcasted query. Wireless Receiving Device 104 that resides on the Mobile Phone 101 detects sent Endpoint Identity and Capability. A Display Conversion 105 software module decodes the received reply, and formats it in a way that is suitable for a Display Device 106, to be presented to the End User. This concludes a simple discovery process.

Mobile Phone 101 might receive several replies to its broadcasted query, provided that multiple Endpoints are within the reach of its wireless transmission. While sending their information using Wireless Transmitter (203), Endpoints should also listen on Wireless Receiver 204, to check if there is any collision. If more than one Endpoint is trying to transfer Endpoint Capabilities, a collision can happen. This collision can be resolved by using similar methods used in Ethernet transmission.

In FIG. 1, solid lines are used to represent connections to the Service Provider 110, dashed lines are used to show broadcasting of querying information, and dotted lines are used to show targets sending Endpoint Identification and Capabilities.

A telephone sends and receives its call control messages and media streams within a primary communication channel and each telephone technology supports a different primary communication channel. Therefore, in order to automatically query nearby Endpoint Capabilities, a means of communication between various telephones using a separate secondary communication channel that lies outside of all the commercially available primary communication channels is given in accordance with one of the preferred embodiments. Examples of such a separate secondary communication channel include infrared, Bluetooth, Wi-Fi 802.11a/b/g, and the like.

Information received from target devices helps to decide if any Endpoint is suitable for further action as is the case for call transfer (e.g., if both devices support audio).

All messages between Endpoints are formatted using XML, which provides a simplified means of collecting and parsing of exchanged data. XML formatting also enables various manufacturers to easily extend Endpoint Capabilities.

If the advanced capabilities (e.g., media streams supported, media encoding/decoding techniques, etc.) of the telephone are sent to the querying telephone, a Session Description Protocol (SDP), that is described in IETF RFC 2327, is used.

Figure 2:
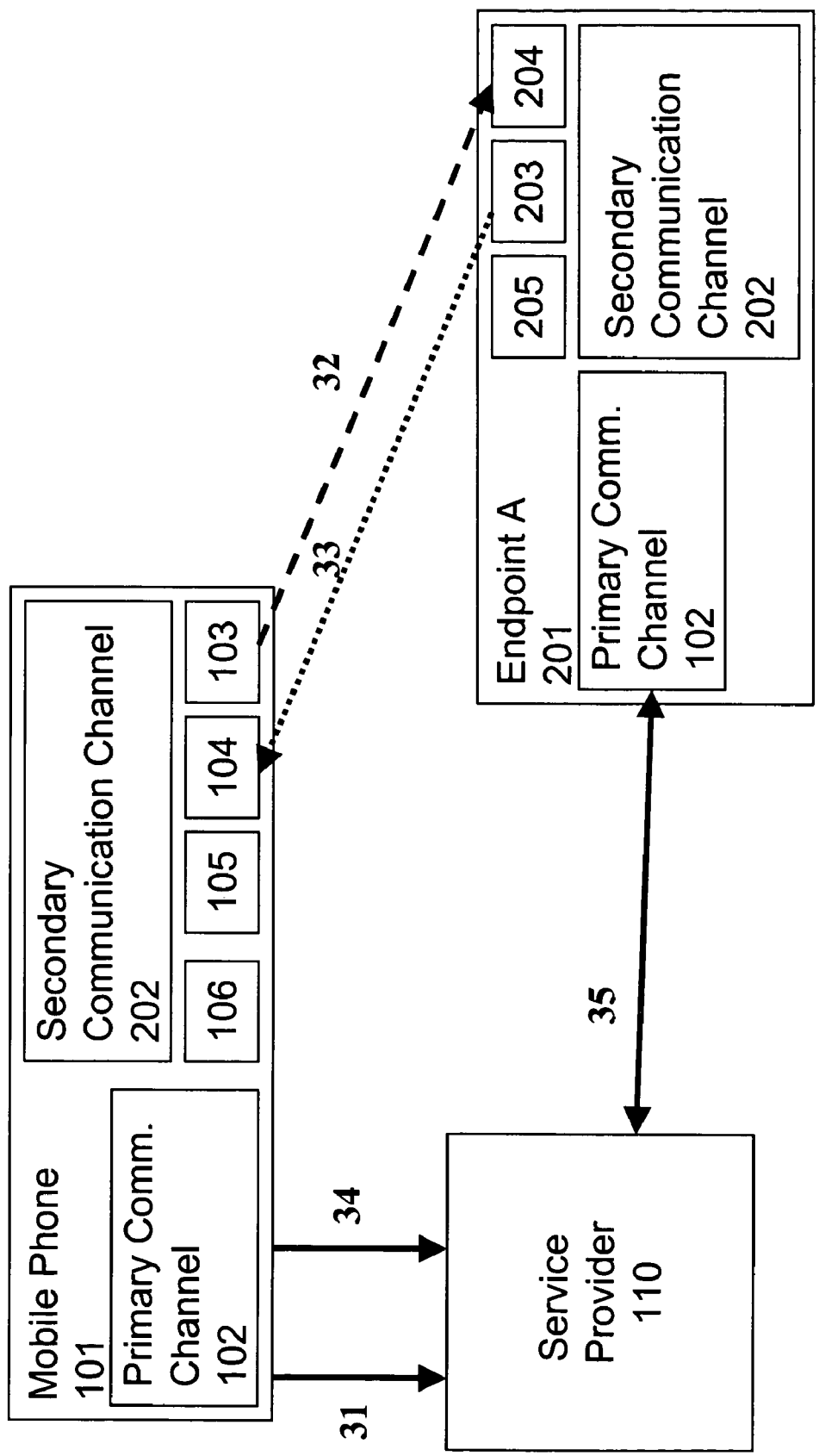

A process step diagram showing a simple call transfer from a Mobile Phone 101 to an Endpoint 201 is shown in FIG. 2. Solid lines are used to indicate usage of the primary communication channel, and dashed and dotted lines are used to indicate usage of the secondary communication channel. Interaction 32 shows Mobile Phone 101 broadcasting a query to the Endpoint A 201. Formatting of this message is shown in the FIG. 4. Interaction 33 shows Endpoint 201 responding to the request for information broadcasted by the Mobile Phone 101. Endpoint 201 replies with its capabilities XML and SDP formatted according to FIG. 5. Interaction 34 shows Mobile Phone 101 requesting that the Service Provider 110 forward the ongoing call to Endpoint 201. Interaction 35 shows that the ongoing call is handed off to Endpoint 201. This concludes the description of how the secondary communication channel is used to modify call state in the primary communication channel.

Figure 3:
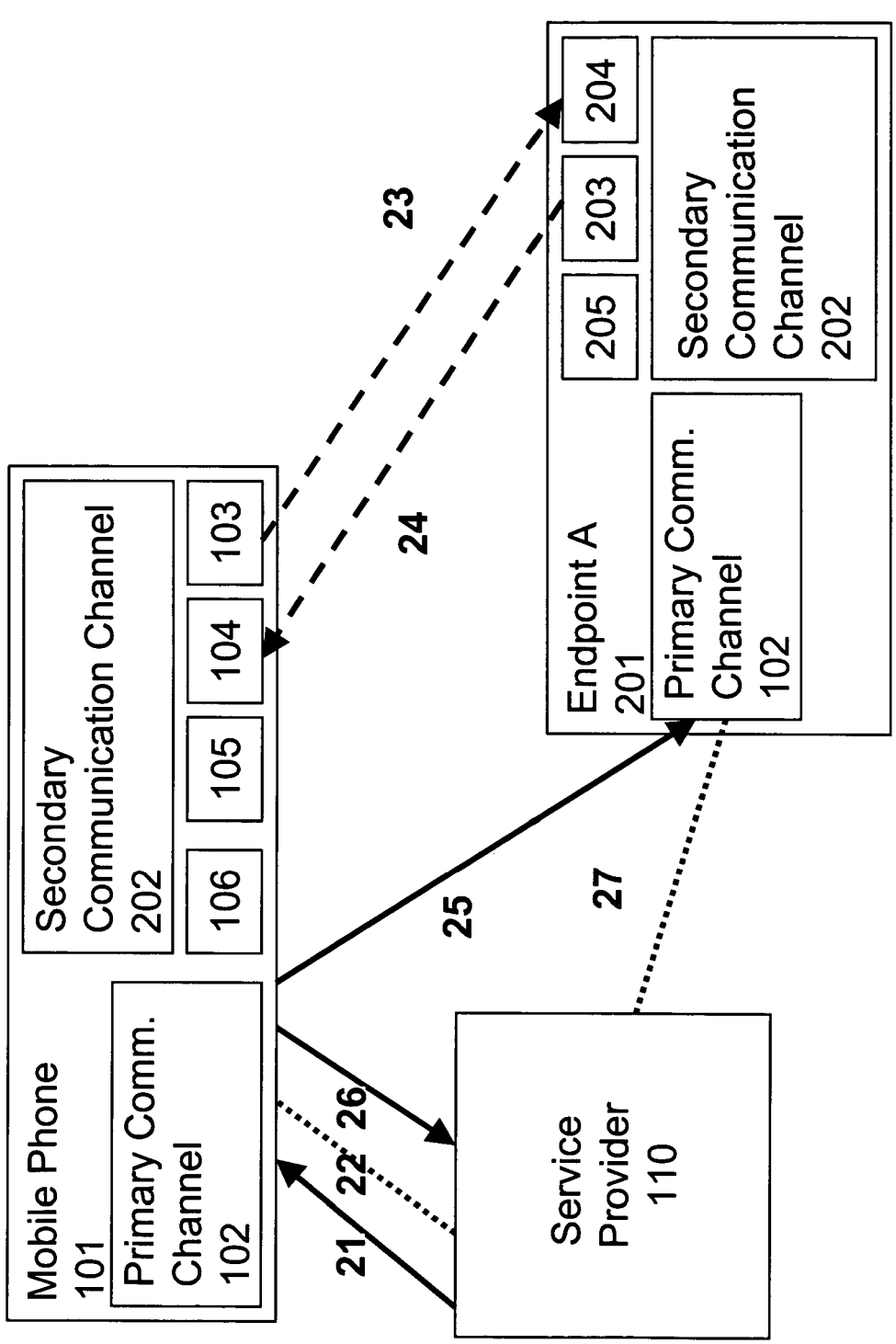

A process set diagram showing a more complex call transfer from a Mobile Phone 101 to an Endpoint 201 is shown in FIG. 3. Solid lines indicate the call control channel that utilizes the primary communication channel. Dotted lines indicate the plurality of media streams that utilize the primary communication channel. Dashed lines indicate the discovery of capabilities that utilize the secondary communication channel. Interaction 21 shows the establishment of the call that terminates in the Mobile Phone 101. Interaction 22 shows the media channel added to the call to Mobile Phone 101. Interaction 23 shows Mobile Phone 101 broadcasting a request for information using the secondary communication channel. Interaction 24 shows Endpoint 103 replying to the requester with its Endpoint Capabilities. Interaction 25 shows Mobile Phone 101 calling directly to Endpoint 201, using capabilities of Endpoint 201 acquired during the telephone discovery phase (23, 24). Interaction 26 shows Mobile Phone 101 requesting Service Provider 110 to transfer media streams to the Endpoint 201. Interaction 27 shows Service Provider 110 transferring media streams of the pending conversation to Endpoint 103. This concludes call discover and call transfer. Endpoint 103 is the active telephone. However, Mobile Phone 101 still controls the status of the call.

Formatting using XML and SDP standards is shown in FIG. 4-7. FIG. 4 shows formatting of the request for information. FIG. 5 shows formatting of the reply to the request for information. FIG. 6 shows an alternative formatting to the formatting used in FIG. 5. FIG. 7 shows formatting of a minimum response to the request for information, which provides the minimum requirements for the Signal Processing Device 205 shown on FIGS. 1-3. It is implied that any existing telephone can be easily retrofitted to provide such minimum functionality.

In another exemplary embodiment, other actions, such as a conference call invitations and the like, can be performed similar to the call transfer shown FIG. 2 and FIG. 3.

The above described system and methods are implemented using a Microsoft PocketPC 2002 based Personal Digital Assistant (PDA) as the querying device. Wireless Transmitting Device 103 (FIG. 1) is implemented as the infrared transmitter on the PDA. Wireless Receiving Device 104 (FIG. 1) is implemented as the infrared sensor on the PDA. A software program written in C++ for PocketPC 2002 target parses information retrieved by wireless Receiving Device 104, and places it in a format to be displayed on the Display Device 106. A PDA screen is used for the Display Device 106. A target telephone is implemented on a PDA. Wireless Receiving Device 204 and Transmitting Device 203 are implemented as an infrared sensor/transmitter on the PDA. Signal Processing Device 205 is implemented as a software program written in C++ for PocketPC 2002, which uses a standard infrared frequency as the secondary communication channel. For the primary communication channel, a combination of wireless 802.11b and wired 100TX Ethernet is used. With the standard infrared frequency allocation, secondary communication channel is well outside of the frequencies of the primary communication channel. The infrared connection used for the secondary communication channel is used for its simplicity to add and small cost. This program is included as a CD-ROM Appendix A. It is written in C++ and runs on Microsoft PocketPC 2002 devices (PDAs).

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

All United States patents and applications, foreign patents, and publications discussed above are hereby incorporated herein by reference in their entireties.

What is claimed is:

1. A system for determining the identity and capability of one or more target phones, comprising:
   a query phone which is held by an end user,
   one or more target phones which have unknown identities and capabilities,
   a wireless transmitting device which is affixed to the query phone and which transmits query signals to the target phones,
   a wireless receiving device which is affixed to each target phone and which receives the query signals,
   a signal processing device affixed to each target phone which determines the identity and capability of each target phone,
   a wireless transmitting device which is affixed to each target phone and which provides a wireless transmitting signal containing the identity and capability of each target phone,
   a wireless receiving device affixed to the query phone and which provides a wireless receiving signal containing the identity and capability of each target phone,
   a display conversion device which is affixed on the query phone and which converts the wireless receiving signal containing the identity and capability of each target phone to an electronic signal, and
   a display which is affixed on the query phone and activated by the electronic signals,
   wherein an end user can view the display on the query phone and determine the identity and capability of each target phone.

2. The system of claim 1, wherein the identity of each target phone is its phone number.

3. The system of claim 1, wherein the identity of each target phone is its VoIP address.

4. The system of claim 1, wherein the query phone is a mobile query phone.

* * * * *